Aug. 7, 1934.    C. L. RUSS    1,969,186
TANK GAUGE
Filed Feb. 6, 1933
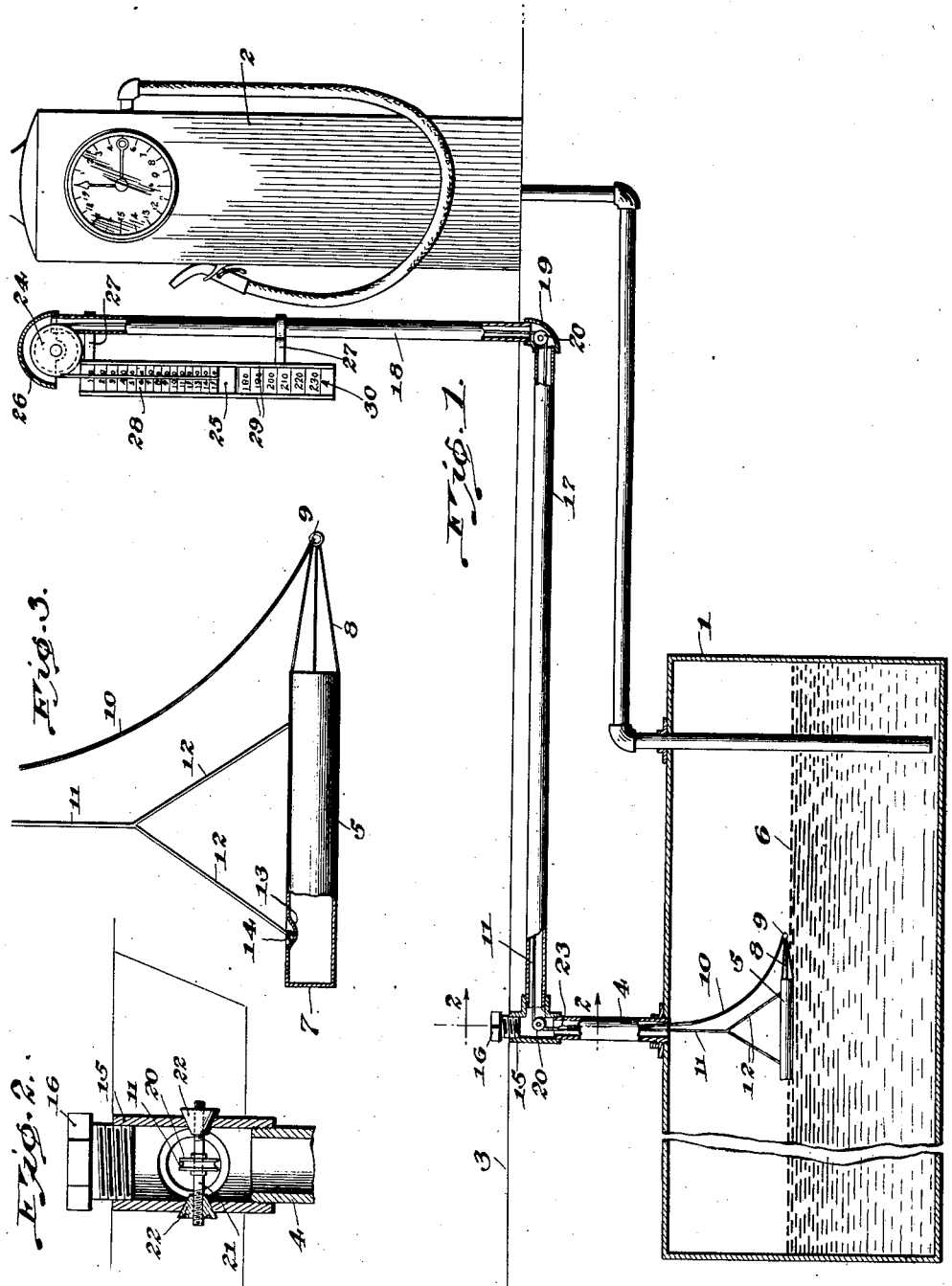
WITNESSES
INVENTOR
C. L. Russ,
BY
ATTORNEY Patented Aug. 7, 1934

1,969,186

UNITED STATES PATENT OFFICE

1,969,186

TANK GAUGE

Charles L. Russ, Phoenix, Ariz.

Application February 6, 1933, Serial No. 655,489

8 Claims. (Cl. 73—82)

This invention relates to improvements in tank gauges, and its objects are as follows:—

First, to provide a tank gauge in the arrangement of which provision is made for abstracting the float from the tank without having to disconnect any parts of the permanent installation and thereby rendering said installation inoperative even for a short period.

Second, to so embody the principle of the invention in the dispensing system of an underground tank that the float can be withdrawn from the tank through the liquid intake pipe for inspection as to fluid tightness and repair.

Third, to provide a cylindrical float which is sufficiently smaller than the liquid intake pipe to enable its withdrawal and restoration through said pipe by means of a permanently attached, normally idle pull cord.

Fourth, to provide said float with a wire or other guard converging from one end of the float toward an attaching point for the pull cord, said guard directing the float into the lower end of the intake pipe upon drawing up the cord for the removal of the float.

Fifth, to indent the float at places in order to secrete means to which the carrying cord is attached, the disposal of said means below the outer surface of the float preventing them from obstructing the movement of the float through the intake pipe.

Sixth, to provide those pipe fittings of the dispensing system at which the carrying cord goes around a bend with a liquid-tight pulley mounting.

Other objects and advantages will appear in the following specification, reference being had to the accompanying drawing in which Figure 1 is a partially sectional and elevational view of a liquid dispensing apparatus, particularly illustrating the embodiment of the improved gauge.

Figure 2 is a vertical section taken substantially on the line 2—2 of Figure 1 illustrating the liquid-tight pulley mounting in one of the pipe fittings.

Figure 3 is a partially elevational and sectional view of the improved float.

The invention is particularly adaptable to storage tanks which are so situated that the amount of liquid contained thereby cannot readily be ascertained. The particular type of tank in mind is the storage tank 1 comprising part of the gasoline dispensing system which embraces the pump 2. This tank, as is customary in service stations, is buried well below the ground line 3. The usual method of measuring the amount of gasoline contained thereby is to reach down with a wantage rod. The use of such a rod requires the frequent uncapping of the intake pipe 4, and unless the rod is carefully stored in a clean place it is likely to carry with it a quantity of dirt which may ultimately clog a part of the system.

The nature and operation of the improved tank gauge is such that the intake pipe 4 does not have to be uncapped for an ascertainment of the amount of gasoline in the tank. It further provides a perpetual indication so that the operator will always know how much gasoline there is in store. There is a float 5 inside of the tank 1. The float rides the surface of the gasoline or other liquid 6. It is cylindrical in shape, chiefly for the purpose of enabling its abstraction from the tank 1 through the intake pipe 4.

End closures such as 7 (Fig. 3) make the float 5 liquid-tight. Floats for indicating purposes such as herein contemplated have been known to spring leaks. The leak may be of such an extent as to seriously impair its function as the means for operating an indicator. The inaccessibility of the underground storage tank makes it impossible to use a float with satisfaction because of the lack of provisions for getting at the float for periodic inspections and a possible repair. One of the purposes of the invention is to enable the abstraction of the float for these purposes, and this without having to render the dispensing system inoperative even for a short time.

A guard 8 consisting of a converging structure, extends from one end of the float 5 (Fig. 3) and terminates in an attaching point 9. The guard may comprise a plurality of wires starting at the periphery of the end and converging toward the point 9. A pull cord 10 is attached at the lower end to the point 9. Its purpose is to up-end the float 5 and draw it through the intake pipe 4. In this operation the converging guard 8 directs the float 5 into the lower end of the pipe.

A carrying cord 11 has branches 12 which are attached to the float 5 at distances from each other. The cords 10, 11 may comprise any flexible elements. The float is indented at 13 (Fig. 3) in order to secrete means 14 to which to secure the free ends of the branches 12. The means 14 may comprise hooks, eyes or the like. The purpose of the indentations 13 is to dispose the means 14 below the outer surface of the float so that there will be no obstruction to catch on the lower end of the pipe 4 and prevent the abstraction of the float. The pipe 4 is sufficiently large in internal diameter to enable the free upward movement of the float together with the branches 12 which will lie over against the side of the float when the latter is up-ended.

The pipe 4 has a T 15 at its upper end. One of the branches of the T is screwed onto the pipe. The opposite branch has a plug or cap 16 which serves as a closure. Upon desiring to fill the tank 1 the T 15 is uncapped and the gasoline is poured in. The right angular branch of the T has a horizontal pipe 17 screwed into it. This is also underground. This pipe is in communication with a standpipe 18, connection being made between the two by an elbow 19.

The pipes 4, 17 and 18, and as many more as will be needed in actual practice, generally constitute a housing through which most of the carrying cord 11 goes. The intake pipe 4 is further distinguished as a conduit, and in this term it is intended to include the upright portion of the T 15 so that advantage may be taken of the general designation of the conduit as a passageway reaching from the tank 1 to the approximate earth level. It is through the conduit, including the pipe 4 and T 15 that the float 5 may be abstracted for inspection at the earth level.

Pulley mountings are situated in the respective T 15 and elbow 19. These elements are herein known as pipe fittings, and they are distinguished from ordinary pipe fittings by being situated at places where the carrying cord 11 goes around bends. The cord 11 is applied to pulleys 20 (Fig. 2) at these bends (Fig. 1). The description of one mounting will serve for all. The pulley 20 (Fig. 2) is rotatably mounted on an axle 21. This is made of brass or other non-corrosive metal. Its threaded ends receive cone shaped brass or copper plugs 22 which are driven into cone shaped holes in the sides of the T 15 from the outside. When these plugs are tightened they make a liquid-tight joint. This is especially necessary at the T 15 to prevent the escape of gasoline. At 19 it is desirable to prevent the in-seepage of water.

It is to be observed that the upper end of the pull cord 10 is attached to the carrying cord 11 approximately at 23. There is an appreciable sag in the pull cord 10, and it is normally idle. It simply goes up and down with the float 5 and the adjacent component of the carrying cord 11, and does not come into play until it is desired to abstract the float. At that time the cap 16 is removed and the cord 11 is caught and drawn up with a hook. When the cord 10 makes its appearance it is pulled upon so as to up-end and abstract the float.

At the upper end of the standpipe 18 there is a large pulley 24 over which the cord 11 passes before being finally attached to a movable indicator 25. The pulley 24 is journaled in a curved guard 26 which is attached to the top end of the standpipe 18. The latter provides a support for the arms 27 of a scale 28. This scale has guides 29 between which the indicator 25 rides. There are graduations 30 on the scale, and these can be made to read in terms of any desired quantities of liquid 6 in the tank 1.

At the ends of the scale the graduations are far apart. They gradually become narrower toward the center so that there may be a proper reading of volumes in agreement with the tank 1 which is cylindrical. It will be understood that when the tank is full there will be a lesser volume in a given vertical division of the tank for which reason the float 5 will drop farther in dispensing 10 gallons from the top and bottom sections of the tank than it will drop when dispensing ten gallons when the liquid level is in the exact middle of the tank.

The operation is readily understood and in this respect the operation of the float 5 is referred to. First of all it must be explained that the float 5 and indicator 25 are balanced. The idea is that the rising and falling of the float 5 will be exactly simulated by the indicator 25. This rising and falling occurs normally during the filling and emptying of the tank 1.

Now suppose it is suspected that the float 5 has sprung a leak, or suppose that it is merely desired to inspect the float in order to be sure that it is in working order. As previously explained, the operator will remove the cap 16 and reach down with a hook to catch the cord 11. It will be necessary to remove the pulley 20 from the T 15 so as to clear the way for the float 5, it being noted that the pulley 20 is situated in the center of the T in order to prevent wear of the cord against projecting parts of the conduit. The pulley is easily removed by unscrewing the conical plugs 22 (Fig. 2) from the axles 21. It would be necessary to unscrew one of the plugs and slip the axle out while holding on to the pulley. Upon pulling the cord 11 through the top opening of the T 15 the end of the pull cord 10 will be seen. This the operator must draw upon in order to up-end the float 5. The guard 8 directs the float into the mouth of the pipe 4. Having finished the inspection of the float the latter is let down through the pipe and into the tank 1, the pulley 20 and axle 21 being replaced.

At this point it should be understood that although a goodly portion of the conduit is buried, spaces will be left at the sides of the T 15 large enough to enable the operator to reach down for the manipulation of the plugs 22. These spaces are shown in Figure 2.

I claim:—

1. An elongated float, a carrying cord extending from the float to work a liquid level indicator, a normally slack pull cord for up-ending the elongated float and withdrawing it lengthwise through a conduit, and a guard on the leading end of the float, guiding said float into the lower end of the conduit preparatory to withdrawal.

2. A gauge for liquid dispensing apparatus which includes a buried tank, a float supported by liquid in the tank, a conduit reaching from the tank to the approximate earth level, a carrying cord extending from the float partially through the conduit to a liquid level indicator, a pull cord normally idle with respect to the float and having one end accessible at the upper end of the conduit for pulling, and a converging structure on the float having the other end of the pull cord attached thereto, said structure guiding the float into the lower end of the conduit upon pulling on the pull cord for the withdrawal of the float through the conduit.

3. A gauge for liquid dispensing apparatus which includes a buried tank, a float supported by liquid in the tank, a conduit reaching from the tank to the approximate earth level, a pull cord extending from the float partially through the conduit and to a liquid level indicator, a pull cord for pulling the float out of the tank through the conduit, one end of the pull cord being attached to the carrying cord adjacent to the upper end of the conduit, and a converging guard structure on the float to guide the float into the lower end of the conduit, said structure having an attaching point to which the other end of the pull cord is secured.

4. A gauge for liquid dispensing apparatus which includes a buried tank, a conduit reaching from the tank to the approximate earth level, a carrying cord extending from a liquid level indicator partially through the conduit and into the tank, a float supported by liquid in the tank, said float having means to which the respective end of the cord is attached, and means for abstracting the float from the tank through the conduit for inspection at the earth surface, said float having an indentation in which the attaching means is secreted to avoid an obstruction on the outer surface of the float.

5. A gauge for liquid dispensing apparatus which includes a buried tank, a float supported by liquid in the tank, said float being adapted to control a liquid level indicator, a carrying cord extending from the float to the indicator, means housing most of the cord, said means including a conduit reaching from the tank to the approximate earth level, said conduit comprising the liquid intake for the tank, and means for abstracting the float from the tank, said means comprising a pull cord attached to the float and extending to a point of attachment to the carrying cord, said point being accessible at the upper end of the conduit.

6. In a gauge for liquid dispensing apparatus which includes a buried tank, a float supported by liquid in the tank, a housing extending from the tank to a liquid level indicator, a carrying cord secured at its ends to the float and indicator and being mostly situated in the housing, said housing including pipe fittings whereat it makes necessary bends, cord supporting structure in each fitting comprising a pulley, an axle for the pulley, said axle having threaded ends, and cone shaped plugs screwed on said ends and wedging into similarly shaped holes in the sides of the fitting to make a liquid-tight joint.

7. In a gauge for liquid dispensing apparatus which includes a tank normally inaccessible, a float supported by liquid in the tank, said float having a flexible element adapted to connect with a liquid level indicator, a conduit reaching from the tank to an accessible location, said conduit housing said element including at least one bend, a pulley in said bend by which said element is guided, and a liquid-tight mount for the pulley comprising cone shaped plugs to engage similar holes in opposite sides of the bend, and an axle threadedly carried by the plugs and going through the pulley.

8. A gauge float having an indentation in its side, cord attaching means situated in the indentation so as to be below the outer surface of the float, and a guard attached to and converging from one end of the float, the free extremity of the guard having a cord-attaching point.

CHARLES L. RUSS.